United States Patent Office 3,634,409
Patented Jan. 11, 1972

3,634,409
3β-TETRAHYDROFURAN-2'-YLOXY-Δ⁴-STEROIDS
OF THE ANDROSTANE AND ESTRANE SERIES
Alexander D. Cross, Mexico City, Mexico, assignor to Syntex Corporation, Panama, Republic of Panama
No Drawing. Filed Apr. 26, 1966, Ser. No. 545,260
Int. Cl. C07c 173/00
U.S. Cl. 260—239.55 R          15 Claims

ABSTRACT OF THE DISCLOSURE

3β - tetrahydrofuran - 2' - yloxy - Δ⁴ steroids of the androstane and estrane series, optionally substituted at C–17 and/or C–18, and of the pregnane and 19-norpregnane series, optionally substituted at C–6, C–16, C–17 and/or C–18, optionally unsaturated at C–6, 7, are prepared from the corresponding 3β-hydroxy steroids upon treatment with dihydrofuran and an aryl sulfonyl halide; these 3β -tetrahydrofuran - 2' - yloxy - Δ⁴ steroids exhibit anabolic and progestational activities.

---

The present invention is directed to certain novel cyclopentanophenanthrene derivatives.

More particularly, the present invention relates to tetrahydrofuranyl ethers of allylic hydroxy cyclopentanophenanthrene compounds.

The novel compounds of the present invention are illustrated by the following formulas:

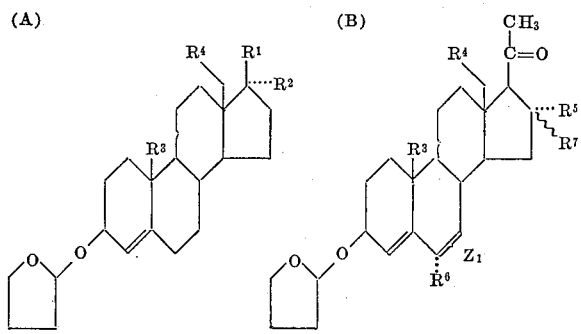

wherein $R^1$ represents hydroxy, tetrahydrofuran-2-yloxy, tetrahydropyran-2-yloxy, or a hydrocarbon carboxylic acyloxy group of less than 12 carbon atoms; $R^2$ represents hydrogen, lower alkyl, lower alkenyl, lower alkynyl or lower haloalkynyl; $R^1$ and $R^2$ taken together represent keto oxygen; $R^3$ represents hydrogen or methyl; $R^4$ represents hydrogen or a lower alkyl containing from 1 to 3 carbon atoms, i.e. methyl, ethyl or propyl; $R^5$ represents hydrogen, hydroxy, a hydrocarbon carboxylic acyloxy group of less than 12 carbon atoms, tetrahydrofuran-2-yloxy or tetrahydropyran-2-yloxy; $R^6$ represents hydrogen, methyl, chloro or fluoro; and $Z^1$ represents a carbon-carbon single bond or a carbon-carbon double bond, provided that $R^6$ is in the alpha configuration when $Z^1$ is a carbon-carbon single bond; and $R^7$ represents hydrogen, alpha methyl or beta methyl.

The acyloxy groups referred to herein are derived from hydrocarbon carboxylic acids containing less than 12 carbon atoms. The hydrocarbon portion of these acids may be saturated or unsaturated, and the chain may be aliphatic, branched, cyclic or aromatic and may be substituted by functional groups such as hydroxy, alkoxy containing up to 5 carbon atoms, acyloxy containing up to 12 carbon atoms, nitro, amino, halogeno and the like. Typical ester groups are the acetate, propionate, butyrate, enanthate, valerate, decanoate, undecenoate, benzoate, trimethylacetate, t-butylacetate, phenoxyacetate, cyclopentylpropionate, aminoacetate, β-chloropropionate, dichloroacetate, hexahydrobenzoate, adamantoate, and the like.

The lower alkyl groups heretofore mentioned, with respect to $R^2$, are derived from normal, branched or cyclic chain hydrocarbons having 6 carbon atoms or less. Typical lower alkyl groups include methyl, ethyl, propyl, isopropyl, butyl, isobutyl, pentyl, hexyl, and the like.

The lower alkenyl groups heretofore mentioned are derived from normal or branched chain olefinic hydrocarbons having 6 carbon atoms or less. Typical lower alkenyl groups include vinyl, propenyl, and the like.

The lower alkynyl groups heretofore mentioned are derived from normal or branched chain acetylenic hydrocarbons having 6 carbon atoms or less. Typical lower alkynyl groups include ethynyl, prop-1-ynyl, and the like.

The lower halo alkynyl groups heretofore mentioned are derived from normal or branched chain acetylenic hydrocarbons having 6 carbon atoms or less and have substituted chlorine or fluorine. Typical lower alkynyl groups include chloroethynyl, trifluoropropynyl, and the like.

The compounds of the present invention represented by Formula A are anabolic agents having a favorable anabolic/androgenic ratio. They are accordingly useful in the treatment or debilitating conditions such as are encountered in advanced age, post-operative conditions, cachetic diseases and the like.

The compounds of the present invention represented by Formula A in which $R^1$ is alkenyl, alkynyl or haloalkynyl, particularly ethynyl, and those represented by Formula B are progestational agents. They are accordingly useful in the control of fertility and in the treatment of conditions usually responsive to progestational therapy, such as amenorrhea, dysmenorrhea, endometriosis, and the like.

The novel 3-tetrahydrofuran-2-yl ethers of the present invention can be administered in a number of pharmaceutical forms, and particularly in forms administered by the oral route, e.g. in solid form, such as pills, pellets, powders, capsules, tablets, or the like, or in liquid form, as solutions, syrups, emulsions, suspensions, or the like.

The novel tetrahydrofuran-2-yl ethers of the present invention may be prepared by treatment of the 3-hydroxy-Δ⁴ steroid, under anhydrous conditions with an excess of dihydrofuran in the presence of catalyst, using especially an arylsulfonyl halide either alone or together with an inert organic solvent such as benzene, hexane, diethyl ether or the like.

Any stable sulfonyl halide may be used as catalyst, and especially p-toluenesulfonyl chloride, benzenesulfonyl chloride, p-nitrobenzenesulfonyl chloride and the like. The reaction is carried out using a large excess of dihydrofuran, as for example, from about 10 to about 25 parts of dihydrofuran per one part of steriod, either alone or in the presence of a co-solvent such as benzene, dioxane, diethyl ether, tetrahydrofuran and the like, in the presence of a catalytic amount of sulfonyl halide, as for example, from about 0.001 to about 0.1 mole equivalents of sulfonyl halide per mole equivalent of dihydrofuran. Equal amounts of dihydrofuran and co-solvents are preferred. The reaction is preferably conducted at room temperature, for a period of time on the order of about 18 to about 48 hours; however, higher or lower temperatures are practical. The tetrahydrofuran-2-yl ether steroid is then isolated in a conventional manner, for example, after this reaction period, the reaction mixture is treated with a small amount of pyridine and then poured into a dilute 10% aqueous sodium bicarbonate solution with stirring and the product is isolated by extraction with an organic solvent non-misible with water, using for example, diethyl ether, methylene chloride, hexane, and the like. The organic extract is concentrated by removing the organic solvent under reduced pressure at a temperature not higher than 40° C. The tetrahydrofuranyl ether crystallizes upon addition of diethyl ether and may be further purified by crystallizing from a suitable solvent or mixtures theerof such as pentane, acetone:hexane, and the like.

When the steroids used for the preparation of the compounds of the present invention possess hydroxyl groups in other positions in addition to the C–3 position, and especially at the C–17 position, it is advisable to protect them through formation of esters, the ester being hydrolyzed later by treatment with alkali. Where the hydroxyl group of the C–17 position is not protected prior to the process, some of the corresponding 3,17-bis(tetrahydrofuran-2-yl) ethers will be obtained.

The 3-tetrahydrofuran - 2 - yloxy-17-hydroxy steroids can be converted to 17-acyloxy steroids by conventional esterification procedures. Thus, the esterification can be carried out in an inert organic solvent, preferably benzene, toluene, xylene, or the like, as well as mixtures thereof with each other in the presence of an acid catalyst, preferably p-toluenesulfonic acid at temperatures ranging from room temperature or lower to reflux temperature for a period varying from approximately 30 minutes to appoximately 48 hours or longer using either an acyl halide, preferably the chloride, such as acetyl chloride, dichloroacetyl chloride, caproyl chloride, and the like, or an acid anhydride of one of the aforementioned acids, such as acetic anhydride, dichloroacetic anhydride, propionic anhydride, caproic anhydride, and the like.

In order that those skilled in the art can more fully understand the present invention, the following examples are set forth. These examples are given solely for the purpose of illustrating the present invention and not as a limitation thereof.

PREPARATION I

To a solution of 5 g. of 17α-ethynyl-17β-hydroxyestr-4-en-3-one in 100 ml. of anhydrous benzene are added 1 g. of p-toluenesulfonic acid and 10 ml. of acetic anhydride. The mixture is allowed to stand for 24 hours at room temperature and is poured with stirring into ice and water. The organic phase is separated, washed with 10% sodium carbonate solution and then with water to neutrality, dried and evaporated. The residue is added to 250 ml. of anhydrous methanol containing 5 ml. of concentrated hydrochloric acid and refluxed for one hour. The mixture is neutralized with an aqueous 5% sodium bicarbonate solution and evaporated to dryness under reduced pressure. The residue is dissolved in methylene chloride, washed with water to neutrality, dried and evaporated to yield 17α-ethynyl-17β-acetoxyestr-4-en-3-one, which is further purified through recrystallization from ether:hexane.

In a similar fashion other 17β-hydroxy steroids can be converted into corresponding 17β-acetoxy derivatives, as for example, 17α-ethynyl-17β-hydroxyandrost-4-en-3-one into 17α-ethynyl-17β-acetoxyandrost-4-en-3-one.

By following the same procedure, but replacing the acetic anhydride with propionic anhydride or caproic anhydride the 17β-propionoxy or 17β-caproxy esters of the corresponding 17β-hydroxy esters are produced.

PREPARATION II

A mixture of 2 g. of 17β-hydroxyestr-4-en-3-one in 8 ml. of pyridine and 4 ml. of adamantoyl chloride is heated at steam bath temperatures for one hour. The mixture is then poured into ice water and the solid which forms is collected by filtration, washed with water and dried to yield 17β-adamantoyloxyestr-4-en-3-one which is further purified through recrystallization from methylene chloride: hexane.

PREPARATION III

To a solution of 5 g. of a 6-chloro-17α-hydroxypregna-4,6-diene-3,20-dione in 100 ml. of anhydrous benzene are added 1 g. of p-toluenesulfonic acid and 10 ml. of caproic anhydride. The mixture is allowed to stand for 24 hours at room temperature and poured with stirring into ice and water. The organic phase is separated, washed with 10% sodium carbonate solution and with water, dried and evaporated to dryness. The residue is dissolved in 250 ml. of absolute methanol containing 5 cc. of concentrated hydrochloric acid. After refluxing for an hour, the mixture is cooled, neutralized with an aqueous potassium bicarbonate solution and evaporated. The residue is dissolved in diethyl ether, washed with water to neutrality, dried and evaporated to yield 6-chloro-17α-caproxypregn-4,6-diene-3,20-dione which is further purified through recrystallization from ether:hexane.

In a similar manner, 6-chloro-16α-methyl-17α-hydroxy-19-norpregn-4,6-diene-3,20-dione can be converted into 6-chloro-16α-methyl - 17α - caproxy - 19 - norpregn-4,6-diene-3,20-dione.

PREPARATION IV

A solution of 1 g. of sodium borohydride in 10 ml. of tetrahydrofuran is added to an ice-cooled solution of 1 g. of 17α-ethyl - 17β - acetoxyestr-4-en-3-one in 20 ml. of tetrahydrofuran and the mixture is then allowed to stand for 16 hours at room temperature. The excess reagent is decomposed by addition of acetic acid and the solution is then concentrated to small volume in vacuo and diluted with water. The product is extracted with ethyl acetate, and these extracts are washed with water, dried and evaporated to yield 17α-ethyl-17β-acetoxyestr-4-en-3β-ol, which may be further purified by recrystallization from acetone:hexane.

By the same method,

17α-methyl-17β-acetoxyandrost-4-en-3β-ol,
17α-ethynyl-17β-acetoxyandrost-4-en-3β-ol,
17α-ethynyl-17β-acetoxyestr-4-en-3β-ol,
17α-chloroethynyl-17-β-acetoxyestr-4-en-3β-ol,
17α-vinyl-17β-acetoxyestr-4-en-3β-ol,
17α-vinyl-18-methyl-17β-acetoxyandrost-4-en-3β-ol,
17β-acetoxyandrost-4-en-3β-ol,
17α-ethynyl-18-methyl-17β-acetoxyandrost-4-en-3β-ol,
3β-hydroxy-6-chloro-17α-acetoxypregna-4,6-dien-20-one,
3β-hydroxy-6-chloro-17α-acetoxy-16α-methyl-19-nor-
  pregna-4,6-dien-20-one, and
17α,18-dimethyl-17β-acetoxyestr-4-en-3β-ol
are prepared from the corresponding 3-keto compound.

17α-vinyl - 18 - methyl - 17β - acetoxyandrost-4-en-3-one and 17α-ethynyl - 18 - methyl - 17β - acetoxyandrost-4-en-3-one are synthesized by the process illustrated in U.S. patent application, Ser. No. 538,581, filed on Mar. 30, 1966. Other 18-alkyl-Δ⁴-androstenes suitable as starting materials for the present invention may be prepared as disclosed in U.S. patent application Ser. No. 538,581.

PREPARATION V

A solution of 200 mg. of 6-chloro-17α-acetoxypregna-4,6-diene-3,20-dione in 32 ml. of anhydrous isopropanol and 25 mg. of sodium borohydride is stirred at room temperature for 15 hours. One-hundred milliliters of water is added and the resulting suspension is extracted several times with ether. The ether phase is dried over sodium sulfate and evaporated to dryness under reduced pressure to yield 3β-hydroxy-6-chloro-17α-acetoxypregna-4,6-dien-20-one which may be further purified by recrystallization from ether.

Similarly, the following compounds can be prepared from the corresponding 3-keto steroid by the same procedure 3β-hydroxy-6-methyl-17α-acetoxypregna-4,6-dien-20-one;
3β-hydroxy-6α-methyl-17α-acetoxy-19-norpregn-4-en-20-one;
3β-hydroxy-6-chloro-17α-acetoxy-19-norpregna-4,6-dien-20-one;
3β-hydroxy-6-methyl-17α-acetoxy-19-norpregna-4,6-dien-20-one;
3β-hydroxy-17α-acetoxy-pregn-4-en-20-one;
3β-hydroxy-6-methyl-17α-caproxypregna-4,6-dien-20-one;
3β-hydroxy-6-chloro-17α-caproxypregna-4,6-dien-20-one;
3β-hydroxy-17α-caproxypregn-4-en-20-one;
3β-hydroxy-17α-caproxy-19-norpregn-4-en-20-one;
3β-hydroxy-6-fluoro-17α-acetoxy-18-methyl-19-norpregna-4,6-dien-20-one; and
3β-hydroxy-17α-acetoxy-18-methylpregn-4-en-20-one.

The 6-fluoro-17α-acetoxy-18-methyl-19-norpregna-4,6-diene-3,20-dione and 17α-acetoxy-18-methylpregn-4-en-20-one are synthesized by the procedures shown in U.S. patent applications, Ser. No. 528,398 filed on February 18, 1966 and Ser. No. 441,297 filed on March 19, 1965, now abandoned. Other 3-keto-18-alkylpregnanes and 19-norpregnanes may be prepared in a similar manner.

Example I

Twenty milliliters of dihydrofuran are added to a solution of 1 g. of 17α-ethynyl-17β-acetoxyestr-4-en-3β-ol in 15 ml. of benzene. About 1 ml. is removed by distillation to remove moisture and 0.4 g. of p-nitrobenzenesulfonyl chloride is added to the cooled solution. This mixture is allowed to stand at room temperature for 48 hours and is then washed with an aqueous sodium carbonate solution and water, dried and evaporated. The residue is chromatographed on neutral alumina, eluting with hexane, to yield 3β-(tetrahydrofuran-2-yloxy)-17α-ethynyl-17β-acetoxyestr-4-ene, which is recrystallized from pentane.

Example II

To a solution of 1 g. of 17α-ethynyl-17β-caproxyestr-4-en-3β-ol in 20 ml. of benzene, 20 ml. of dihydrofuran is added. Five milliliters is distilled off to remove moisture and the mixture is allowed to cool to room temperature. To the cooled mixture, 0.2 g. of freshly purified p-toluenesulphonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The residue crystallizes on the addition of ether to yield 3β-(tetrahydrofuran-2'-yloxy)-17α-ethynyl-17β-caproxyestr-4-ene.

Example III

By repeating the procedure of Example II, the following 3β-tetrahydrofuranyl ethers are obtained from the corresponding 3β-hydroxy compound 3β-(tetrahydrofuran-2'-yloxy)-17α-methyl-17β-acetoxyandrost-4-ene;
3β-(tetrahydrofuran-2'-yloxy)-17α-ethynyl-17β-acetoxyandrost-4-ene;
3β-(tetrahydrofuran-2'-yloxy)-17α-chloroethynyl-17β-acetoxyestr-4-ene;
3β-(tetrahydrofuran-2'-yloxy)-17α-vinyl-17β-acetoxyestr-4-ene;
3β-(tetrahydrofuran-2'-yloxy)-17β-acetoxyandrost-4-ene;
3β-(tetrahydrofuran-2'-yloxy)-17α-ethyl-17β-acetoxyestr-4-ene;
3β-(tetrahydrofuran-2'-yloxy)-17α-vinyl-17β-acetoxyandrost-4-ene;
3β-(tetrahydrofuran-2'-yloxy)-17α-methylethynyl-17β-acetoxyestr-4-ene;
3β-(tetrahydrofuran-2'-yloxy)-17α-chloroethynyl-17β-acetoxyestr-4-ene;
3β-(tetrahydrofuran-2'-yloxy)-17β-acetoxyandrost-4-ene;
3β-(tetrahydrofuran-2'-yloxy)-17β-acetoxyestr-4-ene; and
3β-(tetrahydrofuran-2'-yloxy)-17α-ethynyl-17β-acetoxy-18-methylestr-4-ene.

Example IV

A solution of 0.17 g. of potassium hydroxide in 0.2 ml. of water and 2.5 ml. of methanol is added over a period of 30 minutes to a refluxing solution of 1 g. of 3β-(tetrahydrofuran-2'-yloxy) - 17α-ethynyl-17β-acetoxyestr-4-ene in 30 ml. of methanol under nitrogen. The solution is refluxed for two hours, cooled, neutralized with acetic acid and concentrated under reduced pressure. After the addition of water, the solid which forms is collected by filtration and dried to yield 3β-(tetrahydrofuran-2'-yloxy)-17α-ethynylestr-4-en-17β-ol, which is recrystallized from acetone:hexane.

By following this method the 17β-acetoxy compounds of Example III are converted into the corresponding 17β-hydroxy compounds.

Example V

The procedure of Example II is repeated but using benzenesulfonyl chloride as the catalyst to produce 3β-(tetrahydrofuran-2'-yloxy)-17α-ethynyl - 17β-acetoxyestr-4-ene from 17α-ethynyl-17β-acetoxyestr-4-en-3β-ol.

Example VI

In the method of Example II there is used p-bromobenzenesulfonyl chloride instead of p-toluenesulfonyl chloride as a catalyst, with the same result.

Example VII

To a solution of 1 g. of 3β-hydroxy-6-chloro-17α-acetoxypregna-4,6-dien-20-one in 20 ml. of benzene, 20 ml. of dihydrofuran is added. Five milliliters is distilled off to remove moisture and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The residue crystallizes on the addition of ether to yield the 3β-(tetrahydrofuran-2'-yloxy)-6-chloro-17α-acetoxypregna - 4,6-dien-20-one.

Example VIII

In the method of Example VII, tetrahydrofuran is used instead of benzene as co-solvent and the product is isolated by ether extraction, with similar results.

Example IX

In accordance with the method of Example VII, the compounds listed below under I are respectively converted into the corresponding 3β-tetrahydrofuran-2'-yloxy ethers listed under II below.

| I | II |
|---|---|
| 3β-hydroxy-6-chloro-17α-acetoxy-19-norpregna-4,6-dien-20-one. | 3β-(tetrahydrofuran-2′-yloxy)-6-chloro-17α-acetoxy-19-norpregna-4,6-dien-20-one. |
| 3β-hydroxy-6-methyl-17α-acetoxypregna-4,6-dien-20-one. | 3β-(tetrahydrofuran-2′-yloxy)-6-methyl-17α-acetoxypregna-4,6-dien-20-one. |
| 3β-hydroxy-6-methyl-17α-acetoxy-19-norpregna-4,6-dien-20-one. | 3β-(tetrahydrofuran-2′-yloxy)-6-methyl-17α-acetoxy-19-norpregna-4,6-dien-20-one. |
| 3β-hydroxy-6-fluoro-17α-acetoxy-19-norpregna-4,6-dien-20-one. | 3β-(tetrahydrofuran-2′-yloxy)-6-fluoro-17α-acetoxy-19-norpregna-4,6-dien-20-one. |
| 3β-hydroxy-17α-acetoxy-19-norpregna-4,6-dien-20-one. | 3β-(tetrahydrofuran-2′-yloxy)-17α-acetoxy-19-norpregna-4,6-dien-20-one. |
| 3β-hydroxy-17α-acetoxypregn-4-en-20-one. | 3β-(tetrahydrofuran-2′-yloxy)-17α-acetoxypregn-4-en-20-one. |
| 3β-hydroxy-6α-methyl-17α-caproxypregn-4-en-20-one. | 3β-(tetrahydrofuran-2′-yloxy)-6α-methyl-17α-caproxypregna-4-en-20-one. |
| 3β-hydroxy-6-chloro-17α-caproxy-19-norpregna-4,6-dien-20-one. | 3β-(tetrahydrofuran-2′-yloxy)-6-chloro-17α-caproxy-19-norpregna-4,6-dien-20-one. |
| 3β-hydroxy-6-chloro-17α-caproxypregna-4,6-dien-20-one. | 3β-(tetrahydrofuran-2′-yloxy)-6-chloro-17α-caproxypregna-4,6-dien-20-one. |
| 3β-hydroxy-19-norpregn-4-en-20-one. | 3β-(tetrahydrofuran-2′-yloxy)-19-norpregn-4-en-20-one. |
| 3β-hydroxypregn-4-en-20-one. | 3β-(tetrahydrofuran-2′-yloxy)-pregn-4-en-20-one. |
| 3β-hydroxy-6-chloro-17α-acetoxy-18-methylpregna-4,6-dien-20-one. | 3β-(tetrahydrofuran-2′-yloxy)-6-chloro-17α-acetoxy-18-methylpregna-4,6-dien-20-one. |

Example X

A suspension of 1 g. of 3β-(tetrahydrofuran-2′-yloxy)-6-chloro-17α-propionoxypregn-4,6-dien-20-one in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 3β-(tetrahydrofuran-2′-yloxy)-6-chloro-17α-hydroxypregn-4,6-dien-20-one which is recrystallized from acetone:hexane.

In a similar manner, starting from the corresponding 3β-tetrahydrofuranyloxy-17α-acyloxy compounds obtained in Examples VII and IX, the corresponding 3β-tetrahydrofuranyloxy-17α-hydroxy steroid derivatives are produced.

Example XI

To a solution of 1 g. of 17α-ethynylestr-4-en-3β,17β-diol in 20 ml. of benzene, 20 ml. of dihydrofuran is added. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The residue crystallizes on the addition of ether to yield the 3β,17β-bis(tetrahydrofuran-2′-yloxy)-17α-ethynylestr-4-ene.

In a similar manner, 17α-ethynylandrost-4-ene-3β,17β-diol, 17α-ethylestr-4-ene-3β-diol, 17α-vinylestr-4-ene-3β,17β-diol, 17α-chloroethynylestr-4-ene-3β,17β-diol, 3β,17α-dihydroxy - 6 - chloropregna-4,6-dien-20-one, 3β,17α-dihydroxy-6-methylpregna-4,6-dien-20-one, and 3β,17α-dihydroxypregn-4-en-20-one are converted into the corresponding 3β,17-bistetrahydrofuranyloxy-Δ⁴ steroids.

Example XII

A solution of 6 g. of 3β-(tetrahydrofuran-2′-yloxy)-estr-4-en-17β-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3β-(tetrahydrofuran-2′-yloxy)-estr-4-en-17-one which may be further purified by recrystallization from acetone:hexane.

In a similar manner, 3β-(tetrahydrofuran-2′-yloxy)-androst-4-en-17β-ol is transformed into 3β-(tetrahydrofuran-2′-yloxy)-androst-4-en-17-one and 3β-(tetrahydrofuran-2′-yloxy) - 18 - methylestr-4-en-17β-ol into 3β-(tetrahydrofuran-2′-yloxy)-18-methylestr-4-en-17-one.

Example XIII

To a slurry of 1.0 g. of sodium hydride in 10 ml. of dry diethyleneglycol dimethyl ether under a dry nitrogen atmosphere is slowly added 1.0 g. of 3β-(tetrahydrofuran-2′-yloxy)-17α-hydroxypregn-4-en-20-one in 10 ml. of dry diethyleneglycol dimethyl ether in a dropwise fashion over a 20-minute period. To this mixture is added dropwise, 0.9 g. of 2-chlorotetrahydropyran over a 10-minute period.

The mixture is stirred at room temperature for an additional 30 minutes and then cautiously added to an ice water mixture with stirring. The organic phase is extracted with diethyl ether, dried and evaporated under reduced pressure to yield 3β-(tetrahydrofuran-2′-yloxy)-17α-(tetrahydropyran-2′-yloxy)-pregn-4-en-20-one.

Similarly, 3β-(tetrahydrofuran-2′-yloxy)-17α-ethynylestr-4-en-17β-ol is converted to 3β-(tetrahydrofuran-2′-yloxy)-17β-(tetrahydropyran-2′-yloxy)-17α-ethynylestr-4-ene.

Example XIV

By repeating the process of Example VII using as the steroidal starting material, 3β-hydroxy-6-chloro-16α-methyl-17α-acetoxy-19-norpregna-4,6-dien-20-one, there is obtained 3β-(tetrahydrofuran-2′-yloxy)-6-chloro-16α-methyl-17α-acetoxy-19-norpregna-4,6-dien-20-one.

In a similar manner, other 16α-methyl and 16β-methyl substituted compounds of the present invention are obtained.

What is claimed is:

1. A compound of the formula:

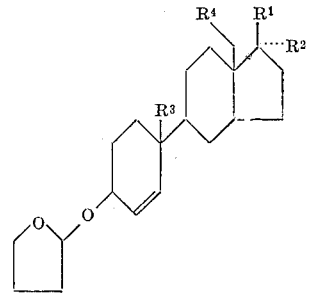

wherein $R^1$ is hydroxy, a hydrocarbon carboxylic acyloxy group of less than 12 carbon atoms, tetrahydrofuran-2-yloxy, or tetrahydropyran-2-yloxy;

$R^2$ is hydrogen, lower alkyl, lower alkenyl, lower alkylnyl or lower halo alkynyl;

$R^1$ and $R^2$ taken together are keto oxygen;

$R^3$ is hydrogen or methy; and $R^4$ is hydrogen or a lower alkyl containing from 1 to 3 carbon atoms.

2. A compound according to claim 1 wherein $R^1$ is hydroxy or acyloxy; and $R^3$ and $R^4$ are hydrogen.

3. A compound according to claim 1 wherein $R^1$ is hydroxy and $R^2$, $R^3$ and $R^4$ are each hydrogen.

4. A compound according to claim 1 wherein $R^1$ is hydroxy, $R^2$ is ethyl and $R^3$ and $R^4$ are each hydrogen.

5. A compound according to claim 1 wherein $R^1$ is hydroxy, $R^2$ is vinyl and $R^3$ and $R^4$ are each hydrogen.

6. A compound according to claim 1 wherein $R^1$ is hydroxy, $R^2$ is ethynyl and $R^3$ and $R^4$ are each hydrogen.

7. A compound according to claim 1 wherein $R^1$ is acetoxy, $R^2$ is ethynyl and $R^3$ and $R^4$ are each hydrogen.

8. A compound according to claim 1 wherein $R^1$ is adamantoxy and $R^2$, $R^3$ and $R^4$ are each hydrogen.

9. A compound according to claim 1 wherein $R^1$ is hydroxy or acyloxy, $R^4$ is methyl and $R^2$ and $R^3$ are each hydrogen.

10. A compound according to claim 1 wherein $R^1$ is hydroxy, $R^2$ is ethyl, $R^4$ is methyl and $R^3$ is hydrogen.

11. A compound according to claim 1 wherein $R^1$ is hydroxy, $R^2$ is vinyl, $R^3$ is hydrogen and $R^4$ is methyl.

12. A compound according to claim 1 wherein $R^1$ is hydroxy, $R^2$ and $R^4$ are each hydrogen and $R^3$ is methyl.

13. A compound according to claim 1 wherein $R^1$ is hydroxy, $R^2$ and $R^3$ are each methyl and, $R^4$ is hydrogen.

14. A compound according to claim 1 wherein $R^1$ is hydroxy, $R^2$ is ethynyl and $R^3$ and $R^4$ are each methyl.

15. A compound according to claim 1 wherein $R^1$ is acetoxy, $R^2$ and $R^4$ are each hydrogen and $R^3$ is methyl.

References Cited

UNITED STATES PATENTS

| | | | |
|---|---|---|---|
| 3,068,249 | 12/1962 | Colton et al. | 260—397.5 |
| 3,253,003 | 5/1966 | Wettstein et al. | 260—397.4 |
| 3,290,297 | 12/1966 | Cross | 260—239.55 |
| 3,300,523 | 1/1967 | Brown et al. | 260—397.4 |

FOREIGN PATENTS

| | | | |
|---|---|---|---|
| 979,894 | 1/1965 | Great Britain | 260—397.4 |
| 672,881 | 10/1963 | Canada | 260—239.55 |

OTHER REFERENCES

Burstein, S. H., et al., Journ. Amer. Chem. Soc., 86, 22, Nov. 20, 1964, pp. 4952–4958.

LEWIS GOTTS, Primary Examiner

E. G. LOVE, Assistant Examiner

U.S. Cl. X.R.

260—397.4, 999

UNITED STATES PATENT OFFICE
CERTIFICATE OF CORRECTION

Patent No. 3,634,409      Dated January 11, 1972

Inventor(s) Alexander D. Cross

It is certified that error appears in the above-identified patent and that said Letters Patent are hereby corrected as shown below:

Column 8, lines 34-45, that portion of the formula reading

" 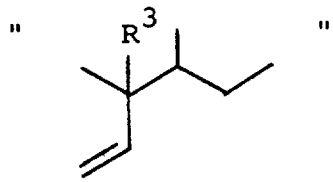 "     should be --  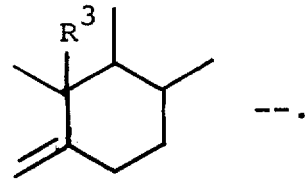  --.

Signed and sealed this 18th day of July 1972.

(SEAL)
Attest:

EDWARD M. FLETCHER, JR.         ROBERT GOTTSCHALK
Attesting Officer                Commissioner of Patents